United States Patent
Wilken et al.

(10) Patent No.: US 10,100,165 B2
(45) Date of Patent: Oct. 16, 2018

(54) SILICONE-COATED RELEASE FILM WITH A SPECIAL VACUUM DEEP DRAWING CAPABILITY

(71) Applicant: FRAUNHOFER-GESELLSCHAFT ZUR FÖRDERUNG DER ANGEWANDTEN FORSCHUNG E.V., Munich (DE)

(72) Inventors: Ralph Wilken, Rastede (DE); Matthias Ott, Dohren (DE); Klaus-Dieter Vissing, Thedinghausen (DE); Gregor Grassl, Stade (DE)

(73) Assignee: Fraunhofer-Gesellschaft z. Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/767,127

(22) PCT Filed: Feb. 11, 2014

(86) PCT No.: PCT/EP2014/052668
§ 371 (c)(1),
(2) Date: Aug. 11, 2015

(87) PCT Pub. No.: WO2014/124945
PCT Pub. Date: Aug. 21, 2014

(65) Prior Publication Data
US 2015/0368418 A1    Dec. 24, 2015

(30) Foreign Application Priority Data

Feb. 12, 2013 (DE) ........................ 10 2013 002 331

(51) Int. Cl.
| | | |
|---|---|---|
| C08G 77/20 | (2006.01) | |
| C08J 7/04 | (2006.01) | |
| C09D 183/14 | (2006.01) | |
| C08L 83/04 | (2006.01) | |
| B29C 71/02 | (2006.01) | |
| C08J 7/12 | (2006.01) | |
| B29C 33/56 | (2006.01) | |
| C09J 7/40 | (2018.01) | |
| C08G 77/12 | (2006.01) | |

(52) U.S. Cl.
CPC .............. *C08J 7/047* (2013.01); *B29C 33/56* (2013.01); *C08J 7/04* (2013.01); *C08J 7/08* (2013.01); *C08J 7/12* (2013.01); *C08L 83/04* (2013.01); *C09D 183/14* (2013.01); *C09J 7/401* (2018.01); *C09J 7/405* (2018.01); *C08G 77/12* (2013.01); *C08G 77/20* (2013.01); *C08J 2367/00* (2013.01); *C08J 2383/04* (2013.01); *C08J 2483/04* (2013.01); *C09J 2423/005* (2013.01); *C09J 2427/005* (2013.01); *C09J 2431/005* (2013.01); *C09J 2467/005* (2013.01); *C09J 2475/005* (2013.01); *C09J 2477/005* (2013.01); *C09J 2483/005* (2013.01); *Y10T 428/266* (2015.01); *Y10T 428/31598* (2015.04); *Y10T 428/31663* (2015.04)

(58) Field of Classification Search
None
See application file for complete search history.

(56) References Cited

U.S. PATENT DOCUMENTS

| | | | | |
|---|---|---|---|---|
| 3,971,866 | A * | 7/1976 | Johnson | C09J 7/0235 156/218 |
| 4,024,100 | A * | 5/1977 | Kuhn | C08G 63/914 524/588 |
| 4,741,948 | A * | 5/1988 | Konishi | B32B 27/08 428/215 |
| 4,751,121 | A * | 6/1988 | Kuhnel | B32B 27/32 428/214 |
| 5,127,974 | A * | 7/1992 | Tomiyama | B29C 51/16 150/166 |
| 5,128,137 | A * | 7/1992 | Muller | A61K 9/703 424/448 |
| 5,242,750 | A * | 9/1993 | Wagner | B29C 51/002 428/316.6 |
| 5,482,766 | A * | 1/1996 | Mathavan | B32B 27/32 428/308.4 |

(Continued)

FOREIGN PATENT DOCUMENTS

| | | |
|---|---|---|
| CN | 102816538 A | 12/2012 |
| DE | 10 2007010 071 A1 | 9/2008 |
| DE | 102007010071 | 9/2008 |
| EP | 0 215 189 A2 | 3/1987 |
| EP | 0 215 189 A3 | 3/1987 |
| EP | 356054 | 2/1990 |
| EP | 2085446 | 8/2009 |
| JP | 2011 201034 | 10/2011 |

OTHER PUBLICATIONS

Machine translation fo DE 102007010071, translation generated Sep. 2016, 16 pages.*

(Continued)

*Primary Examiner* — Robert S Loewe
(74) *Attorney, Agent, or Firm* — Preti Flaherty Beliveau & Pachios LLP

(57) ABSTRACT

Siliconized release film for the production of polymer moldings from fiber composites using a mold, which comprises a support film which is capable of vacuum deep drawing at room temperature and a coating which can be applied in liquid form and consists, optionally after removal of any solvent, of more than 90 atom % of silicon, carbon and/or oxygen, more than 45 atom % of carbon and more than 20 atom % of silicon, in each case based on the total coating and measured by XPS, characterized in that the coating has been crosslinked by means of condensation reactions, addition reactions or radiation.

26 Claims, No Drawings

(56) References Cited

U.S. PATENT DOCUMENTS

| | | | | |
|---|---|---|---|---|
| 5,538,576 | A * | 7/1996 | Knop | B05D 5/06 |
| | | | | 156/229 |
| 5,747,132 | A * | 5/1998 | Matsui | B32B 25/08 |
| | | | | 150/166 |
| 5,932,352 | A * | 8/1999 | Higgins | B41M 5/443 |
| | | | | 428/352 |
| 6,057,041 | A * | 5/2000 | Sumi | B32B 25/20 |
| | | | | 428/40.1 |
| 6,482,491 | B1 * | 11/2002 | Samuelsen | A61F 13/0203 |
| | | | | 424/448 |
| 6,749,794 | B2 * | 6/2004 | Spengler | B29C 37/0032 |
| | | | | 264/101 |
| 7,157,145 | B2 * | 1/2007 | Vissing | B05D 1/62 |
| | | | | 427/452 |
| 8,889,042 | B2 * | 11/2014 | Dziomkina | G03F 7/70341 |
| | | | | 252/588 |
| 2005/0075020 | A1 | 4/2005 | Benayoun et al. | |
| 2006/0019083 | A1 * | 1/2006 | Giogetta | C09J 7/0232 |
| | | | | 428/304.4 |
| 2006/0128921 | A1 * | 6/2006 | Cray | C09D 183/04 |
| | | | | 528/31 |
| 2009/0186183 | A1 | 7/2009 | Michel et al. | |
| 2009/0197078 | A1 * | 8/2009 | Vissing | B01D 67/0088 |
| | | | | 428/336 |
| 2009/0286054 | A1 * | 11/2009 | Meiki | B29C 45/14827 |
| | | | | 428/200 |
| 2010/0239783 | A1 * | 9/2010 | Mao | B29C 33/58 |
| | | | | 427/578 |

OTHER PUBLICATIONS

European Office Action, issued in European Application No. 14 705 094.2, dated Nov. 24, 2017.

Characterization and Failure Analysis of Plastics; ASM International, The Materials Information Society; Editor: Steve Lampman; Dec. 2003, p. 196.

* cited by examiner

SILICONE-COATED RELEASE FILM WITH A SPECIAL VACUUM DEEP DRAWING CAPABILITY The invention relates to silicon-coated release films having particular vacuum deep drawing capability. The invention further relates to the use of such silicone-coated release films as protection and/or separation aid between a mold and a workpiece being formed in a shaping process for producing such a workpiece, in particular in a process for producing polymer moldings composed of fiber-reinforced plastics, also referred to as fiber composites, in a vacuum injection or vacuum infusion process, prepreg process, hand lay-up process, RTM process (injection pressing), pressing process, winding process or fiber spraying process.

Fiber-reinforced plastics consist of matrix-bonded fibers which may be built up in layers. The fibers can be oriented, unoriented or woven. Furthermore, the fibers can consist of various materials such as glass fibers, carbon fibers, aramid fibers, boron fibers, natural fibers or wood. The individual layers can consist of different materials. Thus, woven metal meshes, foam, three-dimensional structured plates such as honeycombs, or wood are suitable for building up such fiber composites. The matrix can consist of a reactive resin which can be cured chemically or thermally. Chemically curable reactive resins are, for instance, polyester resins, vinyl ester resins or epoxy resins. Thermally curable resins are melamine or phenol-formaldehyde resins.

The best-known process for producing such fiber-reinforced plastics is the hand lamination of glass fiber mats or woven fabrics in or on an open mold. In its basic principles, this is suitable for the laying of do-it-yourself repairs, for example motor vehicle bodywork, for instance before sale of a used vehicle. To produce moldings by hand lamination, a release agent is firstly applied into the mold. The "gelcoat" can be applied on top of this. The term gelcoat refers to a hard surface coating layer which is arranged on a molding composed of fiber-reinforced plastics and which can have a thickness of some millimeters. After the gelcoat has been cured, the fibers are applied to it in the form of mats or woven fabrics and impregnated with a resin. A plurality of layer of fibers can be applied and impregnated with resin. The curing of such resin-impregnated fibers can be brought about by addition of chemical hardeners to the resin before processing. Such hardeners can be, for example, free-radical initiators based on benzoyl peroxide or azobisisobutyronitrile. Curing can be carried out at room temperature or at an elevated temperature up to 230° C. A similar process is the vacuum injection process. Here, the dry fibers are covered with a film, after application of vacuum densified by the external air pressure acting on the covering film and the resin is subsequently injected and becomes distributed within the fibers. A further process is fiber spraying into the open mold. Here, a composition made up of fibers and resin is sprayed into the mold or on to the cured gelcoat, with the fibers being comparatively short (up to 50 mm). In the prepreg process, semifinished parts composed of fibers impregnated with a curable matrix, known as prepregs, are used. These are obtainable in the form of mats, are cut to size and introduced into the mold and pressed into the mold by covering with a film and application of vacuum. The resin is subsequently cured under superatmospheric pressure and high temperature. Curing can be carried out at temperatures up to 200° C.

After curing, the workpiece is removed from the mold. In this way, it is possible to produce parts for gliders, rotor blades for wind turbines, boat hulls, motor vehicle parts, tubes, swimming pools and much more.

In all these processes it is very important to treat the mold with a mold release agent before application of the first gelcoat or resin layer in order to allow removal of the workpiece. These mold release agents remain on the polymer molding and on the mold surface after the molding has been removed from the mold. As a result, the moldings and the molds frequently have to be freed in a complicated manner of the mold release agent residues. In addition, the moldings are sometimes joined by adhesive bonding and/or have a surface coating applied with great effort, which requires effective removal of mold release agents. It is therefore desirable to be able to dispense with removal of the mold release agent from the finished workpiece. One solution could be the use of a flexible release film for moderate surface quality requirements, which meets the particular requirements of, in particular, the prepreg and vacuum injection process and is also inexpensive. A flexible film for the purposes of the present text is a film which is capable of vacuum deep drawing at room temperature; a distinction has to be made from the films which are used in thermoforming and are usually referred to as deep-drawable. Such thermoformable films are heated for shaping and either molded into a cooled tool by means of a stamp, compressed air or vacuum referred to as shaping aid and taken out after solidification. A flexible release film (film capable of vacuum deep drawing) within the meaning of the present text should, in contrast, cover and accurately reproduce the contours of complex mold surfaces, without folds and without air inclusions, by means of atmospheric pressure alone. The film has to be able to be removed together with the mold release agent from the workpiece after removal of the cured workpiece from the mold. This flexible film capable of being vacuum deep drawn cold therefore does not depend on lasting thermoplastic deformation or deformability per se. The latter is instead an undesirable property because thermoplasticity can lead to undesirable sticking of the workpiece to the film during thermal curing of the workpiece.

Furthermore, many high-quality polymer moldings and in particular moldings made of fiber-reinforced plastics are provided with a protective film in order to protect them, in particular, against soiling. It would therefore be desirable for the release film also to be suitable for this purpose.

JP 3128240 A describes a silicone-coated mold release film whose coating contains a silicone resin containing a silicone powder having a particle size of from 0.8 to 4 µm in an amount of from 0.02 to 0.5% by weight, based on the silicone resin, and has a weight per unit area of from 0.05 to 1.0 g/m². Due to the comparatively coarse silicone powder particles, the film has a particularly pronounced slipperiness and anti adhesion properties.

It is not possible to see whether this is a flexible film, i.e. a film which can particularly readily fit fine contours and has a particular transfer resistance, i.e. the tendency of not leaving any mold release agent on the workpiece.

The document JP 9076249 A discloses a mold release agent in the form of an aqueous silicone oil dispersion. The silicone oil can be thermally crosslinked after application of the dispersion to a mold. This mold release agent contains tin-organic compounds and can additionally contain non-ionic surfactants. This publication does not disclose a release film but only the mold release agent itself. It cannot be seen whether the workpiece removed later from the mold is free of silicone oil after use of the mold release agent.

The document U.S. Pat. No. 6,057,041 A discloses a release film which is composed of polyester and has a silicone resin layer. The polyester used is biaxially oriented polyethylene-2,6-naphthalenedicarboxylate (PEN). The silicone resin is a crosslinked silicone resin which adheres to the polyester film by means of an $SiO_x$ layer arranged between film and silicone resin. This bonding layer is applied by vapor deposition.

The biaxially oriented PEN film is not a flexible film which can readily adapt its shape to fine contours. In addition, the coating comprising $SiO_x$ is exceptionally complicated to produce. Nothing is known about the transfer resistance of such coatings.

The document JP 2000-289148 A discloses a heat-sealable film which has a mold release agent layer based on silicones and can consist of a thermoplastic such as various polyethylene types or polypropylenes.

Owing to its heat-sealability, this film is unsuitable for high-temperature processing of fiber composite components by heating. A flexible film within the meaning of the present text, i.e. a film which can adapt its shape to fine contours particularly well, is not disclosed.

The document JP 2009-249570 A discloses a silicone mold release agent for films and a film provided therewith. This silicone mold release agent is crosslinkable and contains two different alkenylorganopolysiloxanes, an organohydropolysiloxane, a catalyst based on platinum and an addition retardant.

This reactive mold release agent, which has a complicated composition, still contains undesirable residues of catalyst and addition retardants after crosslinking.

The documents JP 2011-201034 A and JP 2011-01035 A disclose a film which can be removed from a mold and is heat resistant up to 180° C. and is peelable. The film itself is provided from a thermoplastic elastomer or proposed in the form of a multilayer support film. This is coated with fluorosilicones which have silyl groups and hydrolysable groups. Furthermore, an additional bonding layer is provided between support film and silicone layer.

Such a film has to be produced in a complicated manner using fluorosilicones. These fluorosilicones additionally lead to a considerable deterioration in the surface properties of the finished component.

Siliconized release films obtainable on the market are thermoplastic polymer films which are insufficiently flexible and do not have satisfactory ductility properties in order to be able to fit to the fine contours of a mold.

In view of all the above, the prior art lacks release films which are simple to produce and thus inexpensive and at the same time have a satisfactory ability to fit the fine contours of a mold. In particular, the prior art lacks release films whose coating is particularly transfer resistant and does not partly remain adherent to the workpiece after removal of the polymer molding from the mold. In particular, the elongation of the film on adapting to the fine contours of a mold must not reduce the adhesion of the coating to the support film and thus lead to increased transfer of mold release agent to the workpiece.

The objects are achieved according to the invention by a siliconized release film for the production of polymer moldings from fiber composites using a mold, which comprises a support film which is capable of vacuum deep drawing at room temperature and a coating which can be applied in liquid form and consists, optionally after removal of any solvent, of more than 90 atom % of silicon, carbon and/or oxygen, more than 45 atom % of carbon and more than 20 atom % of silicon, in each case based on the total coating and measured by XPS, characterized in that the coating has been crosslinked by means of condensation reactions, addition reactions or radiation. The coating is preferably crosslinked by means of addition reactions or radiation.

For the purposes of the present text, atom percent is the value reported by conventional XPS instruments after the measurement. The various elements apart from helium and hydrogen are quantified with the aid of the respective counts assigned to the element and the ratios are calculated, with the proportion of helium and hydrogen being disregarded.

For the purposes of the invention, the support film capable of vacuum deep drawing is a film capable of vacuum deep drawing as defined above in the description of the prior art. Furthermore, preference is given, in the context of the present description, to the coating in the cured state adhering to the support film sufficiently strongly for no failure of adhesion between support film and coating to occur in a peeling test. This means that the composite of support film, coating and peeling means which is then present is parted in another place.

The invention also encompasses a process for producing a coated release film by coating a support film which is capable of vacuum deep drawing at room temperature, wherein the film is activated in a first step by treatment with wet-chemical primers, corona, DBD, low-pressure plasma, atmospheric pressure plasma and/or vacuum-UV radiation, a reactive silicone mixture is applied in a second step by doctor or blade coating or rolling, where the weight per unit area is from 2 to 50 g/m², preferably from 3 to 15 g/m², particularly preferably from 3 to 5 g/m², and the reactive silicone mixture is crosslinked (preferably by means of heat or radiation) in a third step. However, another form of crosslinking is often also preferred, in particular crosslinking by combining components which are reactive even at room temperature with one another (e.g. 2-component system).

Preference is given to the support film having a stress at 50% elongation in accordance with DIN EN ISO 527 of from 1 to 40 MPa, preferably from 5 to 30 MPa. Further preference is given to the support film having a softening range from 100 to 450° C., particularly preferably from 120 to 250° C., very particularly preferably from 150 to 210° C. Particular preference is given to the coating having been crosslinked by radiation. The crosslinked coating particularly preferably contains not more than 5% by weight, preferably not more than 3% by weight, particularly preferably not more than 2% by weight, of extractable constituents. Further preference is given to the support film consisting of thermoplastic polyester elastomers (TPE-E); thermoplastic copolyesters (TPC); crosslinked thermoplastic elastomers based on olefin (TPE-V/TPV), e.g. mixtures of polypropylene and ethylene-propylene-diene rubber (EPDM/PP), mixtures of natural rubber and polypropylene (NR/PP) or mixtures of nitrile rubber and polypropylene (NBR/PP); thermoplastic elastomers based on urethane (TPE-U/TPU); thermoplastic copolyamides (TPE-A/TPA), for example PEBA and/or mixtures of ethylene-vinyl acetate and polyvinylidene chloride (EVA/PVDC). Particularly preferred thermoplastic polyester elastomers (TPE-E) are polyether esters. Particular preference is given to the support film having a breaking stress in accordance with DIN EN ISO 527, longitudinally and transversely, of from 10 to 150 MPa, preferably from 30 to 100 MPa. Further particular preference is given to the support film having an elongation at break in accordance with DIN EN ISO 527, longitudinally and transversely, of from 100% to 2000%, particularly preferably from 250 to 1500%. Further particular preference is given to the support film having a tear propagation resistance in accordance with DIN ISO 34-1, B, longitudinally and transversely, of from 30 to 500 kN/m, particularly preferably from 60 to 300 kN/m. The support film preferably has a film thickness of from 8 µm to 250 µm, particularly preferably from 15 to 90 µm.

The invention also encompasses the use of an inventive release film as described above as demolding aid in the production of polymer moldings composed of fiber composites and also the use of an inventive release film as described above as protective film for polymer moldings composed of fiber composites.

One embodiment of the invention is the use of the films according to the invention as demolding aid for three-dimensionally curved or complex mold surfaces.

These materials have been found to be particularly useful in combination with the coating to be provided according to the invention since, despite the mechanical stresses associated with deep drawing, both ensure satisfactory adhesion to the coating and also provide a sufficient intactness of the (anti-adhesive) coating.

A preferred embodiment of the invention is a coating whose surface (measured by means of XPS) consists, without taking hydrogen into account, of more than 45 atom percent of carbon.

A further preferred embodiment of the invention is the use of films according to the invention for thermosets; thermoplastics; matrix resin for fiber composite plastics (cured or uncured), in particular based on epoxy resin, polyurethane resin, polyester resin, vinyl ester resin or phenolic resin; polymer foam; surface coating, in particular applied as gelcoat; and adhesive.

An embodiment of the invention is the use of films according to the invention for producing polymer components, with the polymer components being produced by a process selected from the group consisting of injection molding; reaction injection molding (RIM); foaming; processes for producing fiber composites, in particular on the basis of carbon fibers, glass fibers, other inorganic fibers or polymer fibers, preferably (vacuum) infusion, hand lamination, injection processes, particularly preferably resin transfer molding RTM, wet pressing processes, fiber spraying, prepreg processes; in-mold coating and lamination, in particular to produce a composite with wood, metal or plastic. Particular preference is given to using a release film according to the invention for the prepreg process and on a lightning protection matrix composite, in particular a copper matrix composite.

As material for the prepreg process, a semifinished polymer part is supplied as continuous band. The release film of the invention can separate the individual layers of the continuous band from one another (e.g. in the rolled-up state) and thus protect them against undesirable sticking together. In the production of polymer moldings from this semifinished material, it is possible for the lower layer of the material introduced into the mold also to be provided with the film so that the film can exercise a separating effect in relation to the mold. Of course, it is useful to leave only the contact region of the semifinished part with the mold covered by the release film of the invention while the release film naturally has to be removed between the layers of the semifinished part which are to be fused to one another to form the finished polymer molding before the curing process. Such a semifinished polymer part can, for example, be used in prepreg processes and the composite with the release film of the invention thus develops a series of particular advantages such as good handleability and possibility of use in shaping processes without a particular separation aid.

One embodiment of the invention encompasses surface-coating of the release film of the invention. Such a surface coating can be cured together with the polymer material for the polymer molding and remains on the resulting polymer component after peeling-off of the protective layer system, so that the polymer component is present in previously surface-coated form.

A preferred embodiment of the invention is a release film, wherein the release film can be detached from the cured polymer component or the cured semifinished polymer part by means of a force of ≥0.005 N/cm, preferably ≥0.02 N/cm, more preferably ≥0.04 N/cm and/or ≤5 N/cm, preferably ≤2 N/cm and particularly preferably ≤0.5 N/cm, in a 180° peeling test at a peeling speed of about 120 cm/min. Here, in order to attain relatively strong adhesion of the release film, a coating composition which has, within the above-mentioned limits, a relatively high content of oxygen compared to the content of carbon is selected. On the other hand, to attain a relatively low adhesion of the composite film, a coating composition which has, within the abovementioned limits, a relatively low content of oxygen compared to the content of carbon is selected for coating.

Part of the invention is an arrangement to give a mold for shaping a polymer workpiece and a release film according to the invention deep-drawn therein.

A mold for shaping a polymer workpiece normally has a three-dimensional configuration in the region in which it is to have a shaping effect. Accordingly, the deep-drawn release film of the invention is also fitted to this three-dimensionally structured surface in the arrangement according to the invention.

In the arrangement according to the invention, the adhesion conditions are such that a failure of the adhesion takes place between the release film of the invention and the mold in a peeling test. In other words, the cohesive forces within the release film are greater than the adhesive forces between release film and mold.

Preference is given to an arrangement according to the invention in which material for a polymer workpiece (to be shaped) is present on the release film which is deep-drawn in the mold for shaping. Particular preference is given to the material for the polymer workpiece to be at least partially cured, preferably completely cured.

After curing of the polymer workpiece, the place having the lowest adhesive force in the total arrangement is the interface between mold and release film, so that failure of adhesion occurs at this place when the polymer workpiece is taken from the mold.

Within the composite of polymer workpiece and protective film which then remains, the region having the lowest adhesive force is the interface between the coating on the support film and the polymer workpiece. The release film can therefore be peeled off as a whole from the polymer workpiece. In many cases, "kicking-off" will occur, i.e. the separation happens in the region of a boundary layer formed by uncrosslinked constituents of the coating on the support film.

However, in some cases it can be preferred to configure the coating of the support layer so that no or as good as no uncrosslinked constituents remain in the coating. In this case, the separation would occur by rupture of the adhesion between workpiece and coating on the support film.

One embodiment of the invention is the use of the release film as protective film, in particular in its above-described preferred embodiments, and as separation aid on the mold in a polymer shaping process.

The use of the release film makes it possible to save mold release agents and likewise the complicated cleaning steps for removing the mold release agent from the mold and the component which has been removed from the mold.

One embodiment of the invention comprises firstly applying a surface coating composition to the (preferably deep-drawable) protective layer system, optionally partially curing this and subsequently joining it to the actual polymer material for the polymer component or the semifinished polymer part. As indicated above, it is possible to cure the surface coating composition together with the polymer material for the component. Particular preference is given to the combination of protective layer system, optionally surface coating composition and material for the polymer component or the semifinished polymer part (matrix material) together to be a (rollable) continuous band in the case of which the matrix material can, for example, be cured thermally, e.g. after placing in an appropriate mold.

It will be clear to a person skilled in the art that the release film of the invention can remain on the (cured) polymer component until the latter is where it is to perform its function. Thus, the release film can protect the component during transport and handling and be peeled off from the component at the latest possible point in time.

To manufacture a surface-coated fiber composite component, it is possible to use not only the release film of the invention in the production of the prepreg material but also to use a surface coating film (preferably as incompletely cured deformable film material) which is arranged between the film and a unidirectional phenolic resin prepreg material. By means of this prepreg structure, rolled-up or flat material can be fed to a heated molding tool in which the composite is brought to the final shape and cured.

The surface of the coating is protected by the deep-drawable release film during processing and optionally during further processing and/or transport of the component. In addition, it ensures clean molding tools without a buildup of mold release agent and also a uniform coating surface with solvent-free manufacture.

To produce the prepreg material, use is made of a 40 μm thick TPE-E film which has been siliconized beforehand on the side facing the prepreg. The surface coating film is applied to this coating. The preimpregnated fiber material is applied on top of the surface coating film. Not only unidirectional layers or fabrics can be applied here, but it is also possible to apply short fiber material for producing (pseudo) isotropic fiber-reinforced plastics, for example by spraying-on. The surface formed in this way is generally covered with a release film or a release paper. If the fiber composite component to be manufactured is to be made with only one layer of this surface coating-containing semifinished part, a further layer of the above-described siliconized TPE-E film can be used.

After molding and curing, the TPE film can firstly remain as surface protection on the fiber composite component and is only peeled off when required. The siliconization then remains on the TPE film. The joint curing of surface coating film and prepreg material in a heated molding tool gives a strongly bonded composite. Surface defects in the coating surface due to the molding process are suppressed by the adaptable release film just as effectively as classical surface coating defects due to dust or outgassing from the fiber material.

Using the RTM technique, it is possible to produce a CFP component by precompacting the semifinished fiber parts beforehand by means of a preform process. For this purpose, binder-containing woven carbon fiber fabrics are molded and compacted dry by pressing in a preform plant. This is carried out at a temperature which brings about incipient melting of the binder.

Here, a 35 μm thick TPE-E film, which is on the side facing the semifinished textile part, is placed in the preform tool before introduction of the binder-containing semifinished textile part and remains on the side of the component opposite the point of injection until conclusion of the manufacture of the CFP components. The injected epoxy resin therefore has to continue to be separated by means of classical mold release agents from the tool surface on the side with the point of injection.

Another variant can be realized by placing a 35 μm thick TPE-E film, which has been siliconized on the side facing the semifinished textile part, in the preform tool before introduction of the binder-containing semifinished textile part. After introduction, the semifinished textile part is enclosed by means of a further layer of the same flexible release film. After preforming, melting of the binder under pressure at elevated temperature, the release film at the same time offers protection to the semifinished textile part, for example against fraying. The above-described release film thus encloses the CFP component until manufacture of the latter is complete. The film is opened at the point of injection before injection so that the resin can flow to the fiber material.

To produce glass fiber-polymer composites, sheet molding compounds (SMCs) comprising glass fibers and unsaturated polyester resin can be covered in a continuous band process on both sides with a 30 μm thick TPC film which is siliconized on the interior side.

After cutting to size, the SMC plates formed in this way can be molded by pressing without coating of the tool surface over an area with release agent and cured at elevated temperature.

To produce a fiber composite component by winding technology, a tube of 50 μm thick TPC film which has been siliconized on the outside is drawn over the core of a winding plant, which core tapers to the outside. Here, the tube is elongated by about 5% in regions having a small core diameter and by about 50% in positions having a large core diameter. Carbon fiber rovings impregnated with epoxy resin are subsequently wound on to the film.

After thermal curing, the release film tube can be pulled by hand from the CFP component without problems.

EXAMPLES

Example 1

Production of Release Films According to the Invention

To produce the (temporary) protective layer system used according to the invention, the thermoplastic elastomer film based on thermoplastic co-polyether-esters (TPE-E) Platilon M 0486 having a thickness of 38 μm from Epurex Films was pretreated at low pressure by means of a plasma treatment: for this purpose, a 1.8 m wide film was fed into a 3 m$^3$ cylindrical earthed receptacle having a diameter of 1.2 m at a distance of 60 mm on a stretch of 2×400 mm in front of two 2.5 m×400 mm cooled high-frequency (HF) plate electrodes. For this purpose, the rolled-up film was wound off, conveyed over rollers parallel to the electrodes and subsequently wound up. After complete winding-off, this process was repeated in the opposite direction. A high frequency at 13.56 MHz was employed.

The following parameters were selected:
Band speed: 4 m/min,
Power of the HF generator: 3500 W, Gas introduction (oxygen): 2000 sccm (standard cubic centimeters/min), Pressure: 5 Pa, Treatment time: 7 days.

The film which had been treated in this way was coated with addition-crosslinking siliconizing preparations.

TABLE 1

| Addition-crosslinking siliconizing preparations | | |
|---|---|---|
| Substances | S 1 | S 2 |
| ViPo 200 (vinyl-terminated PDM), Wacker-Chemie GmbH | 500 g | 325 g |
| V24 (polyhydrogenmethylsiloxane), Wacker-Chemie GmbH | 12.68 g | 20.83 g |
| MQ 804 (controlled release additive CRA), Wacker-Chemie GmbH | | 175 g |
| Katalysator OL (platinum catalyst complex OL), Wacker-Chemie GmbH | 5.18 g | 5.26 g |

The respective addition-crosslinking siliconizing preparation was applied to the film by roller application in a weight per unit area of 3.1 g/m²±0.2 g/m². To crosslink the coating, the film treated with the siliconizing preparation S1 was maintained at room temperature for 24 hours, and the film treated with the siliconizing preparation S2 was heated at 70° C. for 30 minutes.

The proportion of extractable constituents is a measure of the transfer of silicones to the component because uncrosslinked constituents can be leached from the siliconization, i.e. the crosslinked coating on the film. For this determination of extractable constituents, the siliconizations are extracted by storing 100 cm² of the siliconized film in 15 ml of methyl isobutyl ketone for 24 hours. The silicone concentration of the extract and thus the amount of extracted silicone can be determined by atomic absorption spectroscopy (Perkin Elmer 1100 B equipped with Si Lumina Lamp). In addition, the weight of silicone applied to the siliconized films is determined by means of X-ray fluorescence analysis. The instrument Oxford Lab-X 3000 was used for this purpose. The ratio of the amount of extracted silicone and the weight applied finally gives the content of extractable constituents.

A content of extractable constituents of 1.5% by weight+−0.2% by weight based on the total weight of the siliconization is obtained for both the abovementioned siliconized films.

Example 2

XPS Measurements

The XPS measurements (ESCA measurements) were carried out using the spectrometer Escalab from VG. The calibration of the measuring instrument was carried out in such a way that the aliphatic component of the C 1s peak is at 285.00 eV. Owing to charging effects, it was necessary to shift the energy axis to this fixed value without further modification. The analysis chamber was equipped with an X-ray source for monochromatized Al Kα radiation, an electron source as neutralizer and a quadrupole mass spectrometer. Furthermore, the unit had a magnetic lens which focused the photoelectrons through an inlet slit into a hemispherical analyzer. During the measurement, the normal to the surface pointed to the inlet slit of the hemispherical analyzer. The pass energy in the determination of the molar ratios is in each case 80 eV. In the determination of the peak parameters, the pass energy is in each case 20 eV. The sensitivity factors were adjusted so that when measuring a long-chain silicone oil DMS T 23 from ABCR, $M_w$=13 500 g/mol, the theoretical elemental composition of 25 at % of Si, 25 at % of O and 50 at % of C is determined.

The Si content of the surface of the demolded polymer components is critical to the degree of contamination (as indicated in example 5). The Si contents are indicated below:

Measurement of the siliconized film of example 1-S1: 24.9 at % of Si

Measurement of the siliconized film of example 1-S2: 25.1 at % of Si

Example 3

Deep Drawing Capability

To determine the deep drawing capability, sections of the film of example 1-S2 were deep drawn with vacuum assistance at room temperature in an open mold to an elongation of 250% and gelcoat from Bergolin having the following composition was subsequently applied and cured at room temperature for about 3 hours:

Steodur PUR GELCOAT manual composition 6D970-5015-1; 50 g

Steodur PUR HARDENER 7D202; 30 g

Steodur PUR accelerator blue 6D972-0000; 1.5 ml

The film sections with the coatings could subsequently be peeled off without problems. This even applied to the regions having an elongation of 250%.

Example 4

Measurement of the Peeling Resistance (180° Peeling Test)

The film specimens as per example 1-S1 and as per example 1-S2 and also an uncoated, i.e. silicone-free, film as per example 1 were in each case adhesively bonded to a polycarbonate plate by means of the 2-component epoxide adhesive 2011 Araldite 2001 from Huntsman in an adhesive thickness of about 0.5 mm. After 24 hours at room temperature, 5 strips of film each having a width of 25 mm and a length of 152 mm were, using a method based on ASTM D 903, cut out from above by means of a cutter and peeled off from the cured adhesive by means of a materials testing machine (Z020 from Zwick) at an angle of 180° and a speed of 152 mm/min.

For this purpose, an average force of less than 0.08 N/cm had to be applied for the silicone-coated specimens from example 1 (both variants S1 and S2), while in reference measurements the uncoated, silicone-free film could be peeled off only at about 8 N/cm. It could clearly be seen that the uncoated film was plastically deformed by the pulling, but the silicone-coated films from example 1-S1 and S2 were not.

The peeling force can be controlled via the amount of the CRA used. The peeling force for the film as per example 1-S2 was a factor of 5 greater than that for the film of example 1-S1. The CRAs presumably function as additional crosslinking points in the silicone network, so that the silicone elastomer has greater moduli of elasticity.

Example 5

Glass Fiber Composite Component (Rotor Blade) Produced Using Infusion Technology Before manufacture of a GFP outer skin of a rotor blade for wind turbines by means of the infusion technology, the mold is, instead of being sprayed with a liquid mold release agent, enveloped in a 35 µm thick TPE-E film which had been siliconized beforehand by means of the siliconizing preparation 2 on the side facing away from the mold in a manner analogous to example 1. This film is subsequently drawn deeply into the mold by evacuation at room temperature and the glass fiber lay-up and also the further manufacturing elements are placed thereon. After the conventional buildup of vacuum the fiber material is evacuated and infused with the epoxy-based matrix resin. The GFP component is then cured in a conventional manner by heating and subsequently taken together with the TPE-E film from the mold. The film very largely remains as surface protection on the topcoat until after transport to the wind turbine. Before assembly, the film is peeled off (e.g. by hand). Here, the silicone coating remains virtually completely on the film. After a contact time of 100 hours, only 2.5+/−0.5 at % of Si are determined by means of XPS on the GFP component. The surface structure of the matt TPE-E film ensures a matt surface on the cured exterior skin of the rotor blade.

Example 6

Winding Technique

With the aid of the winding technique, carbon fibers which had been wetted with an epoxy-based matrix resin during the winding operation are shaped and subsequently cured in an autoclave. To achieve mold release agent-free removal from the mold, a 50 µm thick polymer tube which was composed of TPE-E and had been siliconized beforehand on the outside with the siliconizing preparation 2 in a manner analogous to example 1 is drawn on to the core before rolling up. After rolling up, from the outside a second 50 µm thick TPE-E tube which had likewise been siliconized beforehand on the outside with the siliconizing preparation 2 in a manner analogous to example 1 is drawn over the fibers. Here, the exterior side of the tube is, however, tilted inward. This second tube has regular holes through which excess resin material can escape in the autoclave.

Example 7

Carbon Fiber Composite Component Produced Using the Prepreg Technology

With the aid of the prepreg technology, preimpregnated carbon fibers which had been wetted with an epoxy-based matrix resin after production are manually laid (hand lamination) or laid by machine (e.g. tape laying, fiber placement) on or in a mold provided with a release film as per example 1-S2 and subsequently cured in an autoclave. The siliconized side of the film is located on the side facing away from the mold and is thus deeply drawn into the mold so that it rests without folds on the mold surface. The subsequent laying of the prepreg layers is carried out so that the first layer rests on the previously deep-drawn coated protective film. After laying of the last prepreg layer, the conventional buildup of vacuum (with perforated ETFE film, breather and vacuum film) and curing in an autoclave under conditions analogous to those in example 1 for the woven prepreg 977-2A-35-6KHTA-5H-370-T2 are carried out. After removal from the mold, the TPE film initially remains as surface protection on the CFP component and is peeled off only when required. Here, the siliconization remains virtually completely on the TPE film. The CFP surface is free of liquid mold release agents and can therefore be, for example, coated more simply with a surface coating composition than when mold release agents are employed.

Example 8

Preimpregnated Semifinished Parts for Manufacture of Fiber Composite Components: Semifinished Lightning Protection Parts For the manufacture of an outer skin fiber composite component with the aid of preimpregnated semifinished lightning protection parts (copper mesh), the copper mesh which has been preimpregnated with an epoxy resin is wound up on to a roll together with a 40 µm thick TPE-E film which had been siliconized beforehand with the siliconizing preparation 2 on the side facing the preimpregnated copper mesh in a manner analogous to example 1. This preimpregnated copper mesh is subsequently laid together with the film into the mold, either manually or by machine. Any overlapping between neighboring strips necessary to ensure electrical conduction is achieved either by the film being peeled off from the overlapping peripheral region of the upper strip immediately before placing in the mold or this peripheral region is not provided with this film. A plurality of layers of prepreg are then laid as usual on top of the semifinished lightning protection part. After conventional autoclave curing, the fiber composite outer skin including the release film is cleanly removed from the mold. The release film initially remains on the CFP component and is peeled off when required.

Example 9

Preimpregnated Semifinished Parts for the Manufacture of Fiber Composite Components: Fiber Lay-Ups To manufacture a fiber composite component, unidirectional epoxy resin prepreg is wound up on to a roll together with a 40 µm thick TPE-E film which had been siliconized beforehand with the siliconizing preparation 2 on the side facing the prepreg in a manner analogous to example 1. This prepreg is subsequently laid as first layer flush with the film in a mold by machine. Further layers of prepreg without the film are subsequently laid as usual on top of this first layer. After the usual autoclave curing, the fiber composite outer skin including the temporary protective film is cleanly removed from the mold. The film initially remains on the CFP component and is peeled off when required.

The invention claimed is:

1. A siliconized release film for use in the production of a polymer molding using a mold comprising
   a support film being capable of vacuum deep drawing at room temperature;
   wherein the support film has an elongation at break in accordance with DIN EN ISO 527, longitudinally and transversely, of from 100% to 2000%; and
   a coating which is applied in liquid form on the support film and consists, optionally after removal of any solvent, of more than 90 atom % of silicon, carbon and/or oxygen, more than 45 atom % of carbon, and more than 20 atom % of silicon, in each case based on the total coating and measured by XPS;

wherein the coating has been crosslinked by means of condensation reactions or addition reactions;

wherein the polymer molding comprises a fiber composite; and wherein the siliconized release film is flexible and can fit fine contours of a mold.

2. The release film as claimed in claim 1, wherein the support film has a stress at 50% elongation in accordance with DIN EN ISO 527 of from 1 to 40 MPa.

3. The release film as claimed in claim 1, wherein the support film has a softening range from 100 to 450° C.

4. The release film as claimed in claim 1, wherein the crosslinked coating contains not more than 5% by weight of extractable constituents.

5. The release film as claimed in claim 1, wherein the support film consists of thermoplastic polyester elastomers (TPE-E), thermoplastic copolyesters (TPC), crosslinked thermoplastic elastomers based on olefin (TPE-V/TPV); thermoplastic elastomers based on urethane (TPE-U/TPU), thermoplastic copolyamides (TPE-A/TPA) and/or mixtures of ethylene-vinyl acetate and polyvinylidene chloride (EVA/PVDC).

6. The release film as claimed in claim 1, wherein the support film has a breaking stress in accordance with DIN EN ISO 527, longitudinally and transversely, of from 10 to 150 MPa.

7. The release film as claimed in claim 1, wherein the support film has a tear propagation resistance in accordance with DIN ISO 34-1, B, longitudinally and transversely, of from 30 to 500 kN/m.

8. The release film as claimed in claim 1, wherein the support film has a film thickness of from 8 µm to 250 µm.

9. The release film as claimed in claim 1, wherein the support film is present in a deep-drawn state.

10. An arrangement made up of a mold for molding a polymer workpiece and a release film as claimed in claim 1 deep-drawn therein.

11. A process for producing a release film as claimed in claim 1 by coating a support film which is capable of being deep-drawn at room temperature, which comprises or consists of activating the film by treatment with wet-chemical primers, corona, DBD, low-pressure plasma, atmospheric pressure plasma and/or vacuum-UV radiation in a first step, applying a reactive silicone mixture by doctor blade coating or rolling in a second step, where the weight per unit area is from 2 to 50 g/m$^2$, and crosslinking the reactive silicone mixture in a third step.

12. A process for using the release film according to claim 1 comprising using the release film as a demolding aid in the production of polymer moldings composed of fiber composite materials.

13. A process for using the release film according to claim 1 comprising using the release film as a protective film for polymer moldings composed of fiber composite materials.

14. A protective layer system for use with a mold comprising:
a release film comprising:
a support film being capable of vacuum deep drawing at room temperature;
wherein the support film has an elongation at break in accordance with DIN EN ISO 527, longitudinally and transversely, of from 100% to 2000%; and
a coating which is applied in liquid form on the support film and consists, optionally after removal of any solvent, of more than 90 atom % of silicon, carbon and/or oxygen, more than 45 atom % of carbon, and more than 20 atom % of silicon, in each case based on the total coating and measured by XPS;

wherein the coating has been crosslinked by means of condensation reactions, addition reactions or radiation; and a molding component comprising a polymer fiber composite;

wherein the release film with the coating facing the molding component is disposed on and remains as surface protection on the molding component until removed as required with the coating remaining on the support film.

15. The protective layer system according to claim 14, wherein the support film has a stress at 50% elongation in accordance with DIN EN ISO 527 of from 1 to 40 MPa.

16. The protective layer system according to claim 14, wherein the support film has a softening range from 100 to 450° C.

17. The protective layer system according to claim 14, wherein the coating has been cross linked by means of radiation.

18. The protective layer system according to claim 14, wherein the crosslinked coating contains not more than 5% by weight of extractable constituents.

19. The protective layer system according to claim 14, wherein the support film consists of thermoplastic polyester elastomers (TPE-E), thermoplastic copolyesters (TPC), crosslinked thermoplastic elastomers based on olefin (TPE-V/TPV); thermoplastic elastomers based on urethane (TPE-U/TPU), thermoplastic copolyamides (TPE-A/TPA) and/or mixtures of ethylene-vinyl acetate and polyvinylidene chloride (EVA/PVDC).

20. The protective layer system according to claim 14, wherein the support film has a breaking stress in accordance with DIN EN ISO 527, longitudinally and transversely, of from 10 to 150 MPa.

21. The protective layer system according to claim 14, wherein the support film has a tear propagation resistance in accordance with DIN ISO 34-1, B, longitudinally and transversely, of from 30 to 500 kN/m.

22. The protective layer system according to claim 14, wherein the support film has a film thickness of from 8 µm to 250 µm.

23. The protective layer system according to claim 14, wherein the support film is present in a deep-drawn state.

24. A process for producing the protective layer system according to claim 14, comprising:
activating the support film with a treatment selected from the group consisting of a wet-chemical primer treatment, a corona treatment, a DBD treatment, a low-pressure plasma treatment, an atmospheric pressure plasma treatment, a vacuum-UV radiation treatment, and a combination of at least two of the aforementioned treatments;
after the activating step, applying a reactive silicone mixture to the support film by a doctor blade coating process or a rolling process;
wherein the weight per unit area of the reactive silicone mixture applied to the support film is in an amount from 2 to 50 g/m$^2$; and
crosslinking the reactive silicone mixture, thereby coating the support film.

25. A process for using the protective layer system according to claim 14, comprising using the release film as a demolding aid in a production of polymer moldings composed of fiber composite materials.

26. A process for using the protective layer system according to claim 14, comprising using the release film as a protective film for polymer moldings composed of fiber composite materials.

* * * * *